April 28, 1953 P. E. SCHMID 2,636,513
VALVE UNIT
Filed Nov. 7, 1947 2 SHEETS—SHEET 1

PAUL E. SCHMID
Inventor

By John C. Reufer
Attorney

April 28, 1953 P. E. SCHMID 2,636,513
VALVE UNIT

Filed Nov. 7, 1947 2 SHEETS—SHEET 2

PAUL E. SCHMID
Inventor

By John C. Renfer
Attorney

Patented Apr. 28, 1953

2,636,513

UNITED STATES PATENT OFFICE 2,636,513

VALVE UNIT

Paul E. Schmid, Houston, Tex., assignor to Reed Roller Bit Company, Houston, Tex., a corporation of Texas Application November 7, 1947, Serial No. 784,598

4 Claims. (Cl. 137—620)

This invention pertains broadly to pneumatic tools, but more particularly to a valve mechanism for fluid actuated rotary tools of the reversible type.

One object of this invention is to provide a fluid actuated rotary tool of the reversible type with a valve mechanism of simple and efficient construction operable at will for controlling the direction of rotation of the tool.

Another object of this invention is to provide such valve mechanism with ports and passages shaped and positioned for easy and inexpensive manufacture.

A still further object of this invention is to provide such tool with a rotation controlling valve and a throttle valve, both arranged and disposed to form a complete subassembly readily accessible for service or replacement of parts.

Other objects and advantages more or less ancillary to the foregoing and the manner in which the various objects are attained, reside in the specific construction and aggroupment of the elements peculiar to this structure, as will become apparent from a more comp'ete examination of the specification, in the claims of which there are assembled certain specific combination of parts and specific constructions indicative of the scope and spirit of the invention.

Referring to the drawings, in which like symbols designate corresponding parts throughout the several views.

Figure 2:
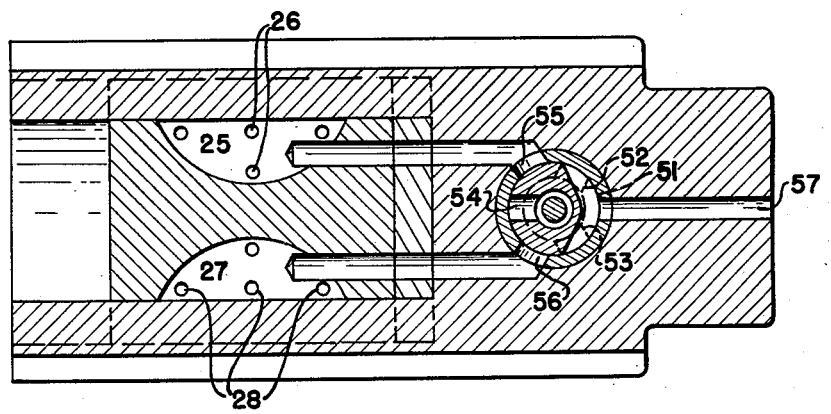
Fig. 2 is a longitudinal sectional view taken in a plane indicated by line 2—2 in Fig. 1 and looking in the direction of the arrows.
Figure 1:
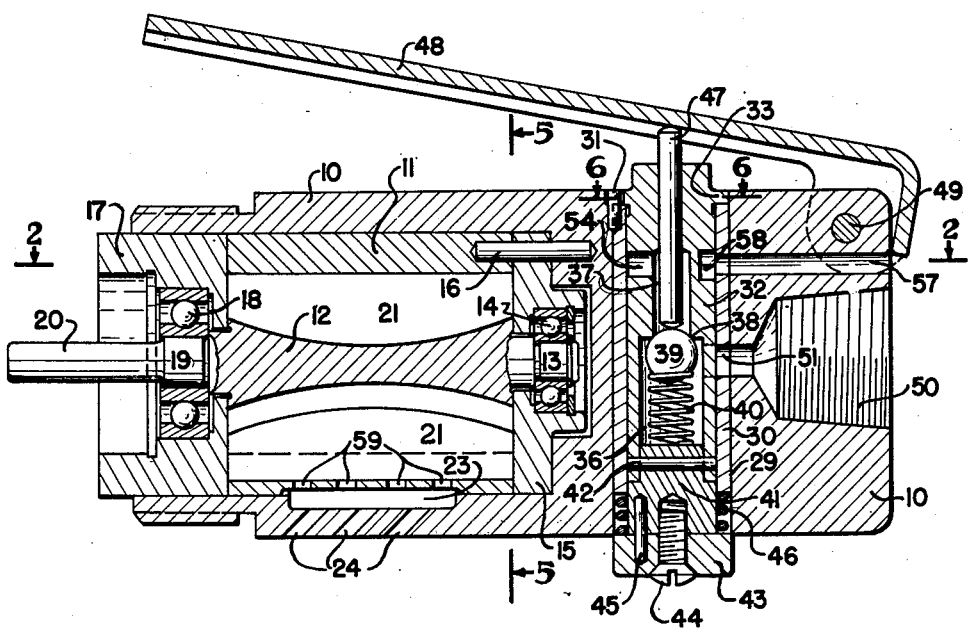
Fig. 1 is a longitudinal sectional view of a fluid actuated rotary tool of the reversible type embodying the invention.

Referring to the drawings for a more detailed description thereof, 10 represents the casing or housing of a fluid actuated rotary tool. In the casing 10 is mounted a stationary motor cylinder 11 accommodating a rotor 12 having an inner shafted end 13 journalled within an adequate bearing 14 which is mounted within a bearing plate 15. The plate 15 is fastened to the casing 10 and cylinder 11 by a dowel 16 and as shown forms one end of the cylinder 11, while the other end is formed by a similar bearing plate 17 also mounted within the casing 10 and accommodating a bearing 18 within which is journalled the outer shafted end 19 of the rotor 12. Beyond the bearing 18, the outer end 19 of the rotor is reduced as at 20 to form a driving end adaptable to receive any suitable work engaging member such as a screw driver, socket wrench or the like, not shown in drawings.

Figure 5:
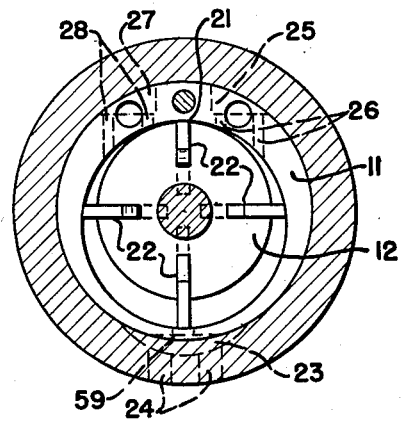
Fig. 5 is a cross-sectional view taken in a plane indicated by line 5—5 in Fig. 1 and looking in the direction of the arrows.

As is customary in tools of this type, the rotor 12 is of smaller diameter than the inner diameter of the cylinder 11 and is mounted eccentrically therein to form a oubstantially line contact such as shown at 21 in Fig. 5. Carried by the rotor also in the usual manner are four equidistant radially slidable blades 22, each having its outer end engaging the inner wall of the cylinder 11 and maintained in this engaging position either by the centrifugal force resulting from their rotation with the rotor 12 or by any other means such as pressure fluid admitted under the blades or small compression springs located between the blades and the bottom of the rotor slots within which the blades are mounted.

Diametrically opposed to the line contact 21, the cylinder 11 is provided with ports 59 extending through its wall into a passage 23 which in turn is connected to the outside of the casing 10 through exhaust ports 24.

On one side of the line contact 21 but adjacent thereto, the cylinder 11 has its external wall mi'led out to form a passage 25 of substantially triangular cross section as shown in Fig. 5 and of semi-circular longitudinal section as shown in Fig. 2. This passage is connected with the interior of the cylinder by ports 26 opening therein at a point adjacent the line contact 21.

On the other side of the line contact 21, the cylinder 11 is provided with a passage 27 and ports 28 similar to the passage 25 and ports 26.

Referring now more particularly to the invention, the housing 10 is provided with one diameter bore 29 extending diametrically therethrough within which is closely fitted but removably mounted a sleeve 30 which falls short of the ends of the bore 29 and is fastened against rotation relative to the housing by a dowel 31.

Rotatably mounted within the sleeve 30 but closely fitted therein, there is a cylindrical valve 32 formed with a flange 33 resting on the upper end of sleeve 30 and provided with a cut-away portion forming stops 34 and 35 engageable with the dowel 31 for limiting the rotation of the valve 32. The valve 32 is provided with an axial part which includes two bores 36 and 37 forming at their inter-section an annular valve seat 38 in which may be seated a ball shaped throttle valve 39 normally urged on its seat by a compression spring 40, which spring rests on a plug 41 fastened to the end of the valve by a cross pin 42. The valve 32 may be turned by a knob 43 which protrudes beyond the external configuration of the housing 10 and is secured to the plug 41 by a screw 44 and dowel 45. Affording adequate frictional engagement of the flange 33 with the bushing 30 to prevent accidental rotation of the valve 32, there is a compression spring 46 interposed between the end of the bushing 30 and knob 43. The ball shaped throttle valve 39 can be moved from its seat 38 by a pin 47 slidable through the valve 32 and operable by a lever 48 pivotally secured to one end of the housing 10 by a cross pin 49.

Figure 3:
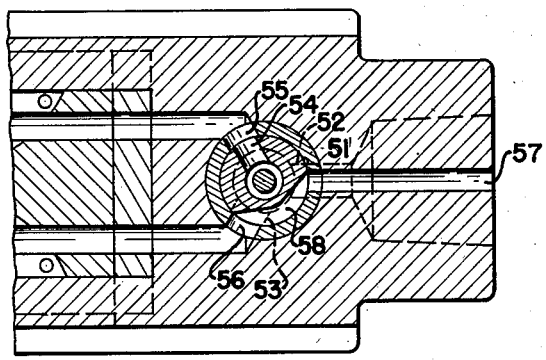
Figs. 3 and 4 are fractional views corresponding to Fig. 2 but showing the rotation controlling valve in different positions.
Figure 4:
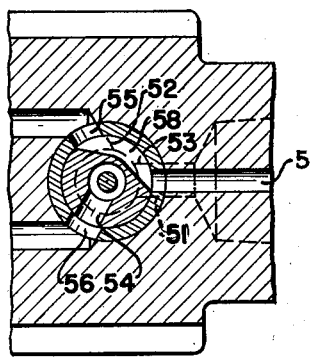

The housing 10 is provided with a motive fluid connection 50 which is adapted to receive the discharging end of a fluid carrying conduit. From the connection 50, there is a motive fluid conveying passage 51 extending radially through the bushing 30 to the peripheral wall of the valve. Within the same plane as the passage 51, the valve 32 is provided with two inlet ports 52 and 53 capable of registration with the passage 51 for admitting pressure fluid into one end of the axial port 36—37 as shown in Figs. 3 and 4, or capable of being circumferentially spaced from the passage 51 as shown in Fig. 2 to prevent admission of pressure fluid into the valve 32.

Longitudinally spaced from the ports 52 and 53, the valve 32 is provided with a radial port 54 which opens into the valve passage 37 and is capable of registration with the motive fluid supplying ports 55 and 56 extending through the sleeve 30. The port 55 extends through the housing 10 to open into the cylinder passage 25, while the port 56 similarly opens into the cylinder passage 27.

Leading from the interior of the bushing 30 to the atmosphere, there is provided an exhaust port 57 which is capable of registration with either port 55 or 56 through a recess or groove 58 provided on the valve 32.

Figure 6:
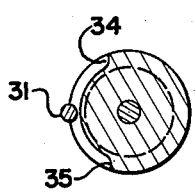
Fig. 6 is a cross-sectional view taken in a plane indicated by line 6—6 in Fig. 1.

In the operation of the device, it is now apparent that admission of motive fluid into the rotation controlling valve passage 37 is controllable through the throttle valve 39. By exerting manual pressure on the lever 48 the pin 47 will act on the ball 39 to move it away from the seat 38, thereby affording communication of the one end 36 of the axial port with the other end 37 thereof. It will also be apparent that the rotation controlling valve 32 may be rotated through the knob 43 either in the position shown in Figs. 2 and 6, or in the two extreme positions shown in Figs. 3 and 4. If positioned as shown in Figs. 2 and 6, that is half way between its extreme possible rotation, it will be noted that the valve inlet ports 52 and 53 are out of registration with the motive fluid conveying passage 51, thereby preventing admission of the motive fluid to the tool even though the throttle valve 39 is opened. From this entirely "off" position of the valve 32 to a full "on" position as shown in either Fig. 3 or 4, it will be understood that the valve 32 may be positioned to afford only partial registration of either port 52 or 53 with the passage 51, thereby controlling not only the direction of rotation of the tool as will be hereinafter explained, but also the speed of the tool within a range below its maximum, which maximum speed is obtainable by complete registration of either port 52 or 53 with the passage 51.

With the throttle valve 39 opened and the rotation controlling valve 32 positioned as shown in Fig. 3, pressure fluid from the connection 50 and main inlet passage 51 will flow into the lower end 36 of the valve axial port 36 through the valve port 52 which is in complete registration with the inlet passage 51, a position of the valve 32 which is assured by the stop 35 engaging the dowel pin 31. From the lower end 36 of the axial port, the pressure fluid will flow into the upper end 37 over the valve seat 38. Since the valve passage port 54 is now in registration with the port 55, pressure fluid will flow from the valve axial port 37 into the cylinder passage 25 and therefrom into the cylinder 11 through the ports 26 to act on the blades 22 for imparting rotation to the rotor 12 in a clockwise direction in Fig. 5. When each blade passes over the cylinder ports 59, the pressure fluid previously admitted into the cylinder is free to exhaust to the atmosphere via the ports 59, the passage 23 and exhaust ports 24. As each blade 22 continues its clockwise rotation after having passed over the exhaust ports 59, air or any remaining pressure fluid trapped between the blade and the line contact 21 is free to exhaust through the cylinder ports 26, the cylinder passage 27, the port 56 and exhaust port 57, the former being in communication with the latter through the valve groove 58.

Rotation thus imparted to the rotor 12 is of course also imparted to its driving end 20 for imparting rotation to the work.

When it is desired to reverse the direction of rotation of the tool, the valve 32 may be positioned as shown in Fig. 4, which position is assured by the stop 34 engaging the dowel pin 31. In this position of the valve 32, since the valve radial port 54 is now in registration with the motive fluid supplying port 56, pressure fluid will be admitted into the cylinder 11 through the passage 27 and ports 28 to act on the blades 22 for imparting rotation to the rotor 12 in a counterclockwise direction in Fig. 5. When the blades pass over the cylinder ports 59, the pressure fluid admitted into the cylinder through the ports 28 is free to exhaust to the atmosphere via the ports 59, the passage 23 and exhaust ports 24. As the blades rotate in a counterclockwise direction, the air or remaining pressure fluid trapped between the exhaust ports 59 and the line contact 21 will be free to exhaust via the cylinder ports 26, passage 25, port 55, valve groove 58 and exhaust port 57.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim.

1. A valve unit comprising a valve housing, cylindrical sleeve fixed in said housing, a cylindrical valve rotatable in said sleeve having an annular flange resting on the first end thereof, an operating knob for said valve extending beyond said housing from the second end of said sleeve, spring means between said knob and the second end of said sleeve assuring frictional engagement of said flange with the first end of said sleeve, a motive fluid conveying passage in said housing and through said sleeve leading to said valve, an axial port in said valve, at least one inlet port leading from one end of said axial port through said valve and movable into or out of communication with said passage upon rotation of the valve, a duality of motive fluid supplying ports and an exhaust port in said housing and through said sleeve, means in said valve affording communication of one of said motive fluid supplying ports with the other end of said axial port and concurrent communications of the other fluid supplying port with said exhaust port when said valve is positioned for communication of said inlet port with said passage, and a throttle valve movable in said cylindrical valve for controlling the flow of motive fluid from one to the other end of said axial port.

2. A valve unit comprising a valve housing, a cylindrical sleeve fixed in said housing, a cylindrical valve rotatable in said sleeve having an annular flange resting on the first end thereof, an operating knob for said valve extending beyond said housing from the second end of said sleeve, spring means between said knob and the second end of said sleeve assuring frictional engagement of said flange with the first end of said sleeve, a motive fluid conveying passage in said housing and through said sleeve leading to said valve, an axial port in said valve provided with a valve seat intermediate its ends, at least one inlet port leading from said axial port on one side of said seat through said valve and movable into or out of communication with said passage upon rotation of the valve, a duality of motive fluid supplying ports and an exhaust port in said housing and through said sleeve, means in said valve affording communication of one of said motive fluid supplying ports with said axial port on the other side of said seat and concurrent communication of the other fluid supplying port with said exhaust port when said valve is positioned for communication of said inlet port with said passage, and a throttle valve movable into open or closed position relative to said seat for controlling the flow of motive fluid through said axial port.

3. A valve unit comprising a valve housing, a cylindrical sleeve fixed in said housing, a cylindrical valve rotatable in said sleeve having an annular flange resting on the first end thereof, an operating knob for said valve extending beyond said housing from the second end of said sleeve, spring means between said knob and the second end of said sleeve assuring frictional engagement of said flange with the first end of said sleeve, a motive fluid conveying passage and a duality of motive fluid supplying ports in said housing and through said sleeve opening on said valve with said ports axially spaced from said passage, means including an axial port in said valve affording communication of one or the other of said fluid supplying ports with said passage upon rotation of said valve, and a movable throttle valve in said axial port for controlling the flow of motive fluid therethrough.

4. A valve unit comprising a valve housing, a cylindrical sleeve fixed in said housing, a cylindrical valve rotatable in said sleeve having an annular flange resting on the first end thereof, an operating knob for said valve extending beyond said housing from the second end of said sleeve, spring means between said knob and the second end of said sleeve assuring frictional engagement of said flange with the first end of said sleeve, a motive fluid conveying passage and a duality of motive fluid supplying ports in said housing and through said sleeve opening on said valve with said ports axially spaced from said passage, an exhaust port in said housing and through said sleeve, means including an axial port in said valve affording communication of one or the other of said fluid supplying ports with said passage upon rotation of said valve, means outside of said axial port affording communication of one or the other of said fluid supplying ports with said exhaust port, and a movable throttle valve in said axial port for controlling the flow of motive fluid therethrough.

PAUL E. SCHMID.

References Cited in the file of this patent

UNITED STATES PATENTS

| Number | Name | Date |
|---|---|---|
| 679,533 | Moore | July 30, 1901 |
| 1,001,997 | Scott | Aug. 29, 1911 |
| 1,026,459 | Rush | May 14, 1912 |
| 1,136,717 | Possons | Apr. 20, 1915 |
| 1,181,305 | Gordon | May 2, 1916 |
| 1,223,022 | Baird | Apr. 17, 1917 |
| 1,485,957 | Bridgham | Mar. 4, 1924 |
| 2,014,997 | Auger | Sept. 17, 1935 |
| 2,117,584 | Van Sittert | May 17, 1938 |
| 2,217,876 | Richardson | Oct. 15, 1940 |
| 2,423,957 | Amtsberg | July 15, 1947 |

FOREIGN PATENTS

| Number | Country | Date |
|---|---|---|
| 756,737 | France | of 1933 |